United States Patent [19]
Johnson

[11] Patent Number: 5,064,040
[45] Date of Patent: Nov. 12, 1991

[54] SPLINED CLUTCH DRUM MOUNTING

[75] Inventor: Douglas R. Johnson, Waterloo, Iowa

[73] Assignee: Deere & Company, Moline, Ill.

[21] Appl. No.: 655,617

[22] Filed: Feb. 14, 1991

[51] Int. Cl.5 .......................... F16D 1/06; F16D 25/12
[52] U.S. Cl. .................................. 192/85 AA; 74/434;
192/70.16; 192/110 R; 277/DIG. 8; 403/359
[58] Field of Search ............. 192/85 AA, 70.2, 110 R,
192/70.12, 113 B, 70.16; 74/468, 434, 457;
464/16; 277/6, 138, DIG. 8; 403/359

[56] References Cited
U.S. PATENT DOCUMENTS

| | | | |
|---|---|---|---|
| 1,779,805 | 10/1930 | Dunwoodie | 403/359 |
| 2,511,520 | 6/1950 | Walton | 192/85 AA |
| 4,473,144 | 9/1984 | Allori | 192/85 AA X |
| 4,961,669 | 10/1990 | Itoh et al. | 74/468 X |

Primary Examiner—Rodney H. Bonck

[57] ABSTRACT

An oil passage connection between a shaft and a clutch drum is sealed by intentionally providing an imbalance in the forces acting on splines mounting the clutch drum to the shaft. The sides of at least some of the splines are angled, so that at least some part of any torque applied between the clutch drum and shaft is resolved into radial components. By providing a differing number of splines, or an asymmetrical positioning of the splines, the net force can be designed to force the sides of the shaft and the clutch drum adjacent to the oil passage tightly together. This is most easily accomplished by simply omitting one or more splines from the clutch drum on either side of the oil passage. With such a structure, the same splines on the shaft can be used to mount gears and the like, which normally require symmetrical distribution of forces.

6 Claims, 2 Drawing Sheets

SPLINED CLUTCH DRUM MOUNTING

BACKGROUND OF THE INVENTION

1. Field of the Invention

The present invention relates to techniques for mounting a clutch drum to a shaft, where torque must be transferred between the shaft and the clutch drum, and where the shaft has an oil passage supplying oil to actuate the clutch.

2. Description of the Related Art

Clutch drums frequently are mounted to transmission shafts so that an oil passage in the shaft is connected to provide oil to the clutch operating piston. This means that a seal must be formed between the clutch drum and the shaft so that oil does not leak out of the oil passage. Multiple clutch drums (with associated oil passages) often are mounted on a single shaft, making sealing of the various oil passages even more difficult. At the same time, each clutch drum must be mounted to the shaft to allow transmission of torque between the clutch drum and the shaft.

Various techniques have been used in the past to provide a suitable mounting. One technique is to mount the clutch drum on the shaft with a press fit to seal the oil passage. A key then is used to drive the clutch drum. However, keyways are limited in the amount of torque they can carry due to the stresses on the key and the stress concentrations produced in the shaft.

A second approach is to weld the drum to the clutch, or to make both pieces in a single forging. This method is costly and limits the number of clutches on the shaft due to assembly problems.

SUMMARY OF THE INVENTION

It is the object of the present invention to provide a mounting structure for mounting a clutch drum or other similar component to a shaft in a manner which will seal an oil passage between the two and allow transmission of torque between them.

This object is achieved according to the present invention by splining the clutch drum to the shaft with angled cross-section splines, but intentionally providing an imbalance in the net radial forces produced by the splines.

When torque is transmitted between components connected by splines with angled cross-sections, the angled sides of the splines resolve some of the torque into radial forces. Normal design practice ensures that the radial forces generated by the splines cancel each other out. However, according to the present invention, the forces intentionally are left imbalanced, e.g., by arranging the splines asymmetrically or by omitting one or more of the splines.

According to the present invention, the radial forces are left imbalanced in such a fashion as to press the clutch drum and shaft tightly together in the vicinity of the oil passage, forming a tight seal between the two. Meanwhile, the splines provide ample torque transmission capability.

Preferably, the splines formed on the shaft are distributed about the shaft in the usual symmetrical patterns. With such a spline arrangement, other components, e.g., gears or bearings, can be provided with matching, symmetrically distributed splines to mount them to the shaft with the radial forces cancelling out. Just the clutch drum then is formed with one or more of its splines omitted, e.g., the splines on either side of the oil passage, to produce the desired resultant force imbalance.

This structure has numerous advantages. The shaft may be milled or manufactured using conventional hobbing practices. The bore on the mating drum is broached or shaper-cut using conventional methods,.

Such a spline-mounted technique is cost-effective, easily assembled and can carry large amounts of torque. The same splines may be used to mount multiple clutch drums and gears, simplifying machining and assembly. If desired, a tight tolerance on the outer diameter of one or more of the splines can be used to provide excellent locational tolerances.

BRIEF DESCRIPTION OF THE DRAWINGS

The invention will be described in greater detail with reference to the following drawings.

DETAILED DESCRIPTION OF THE PREFERRED EMBODIMENTS

Figure 1:
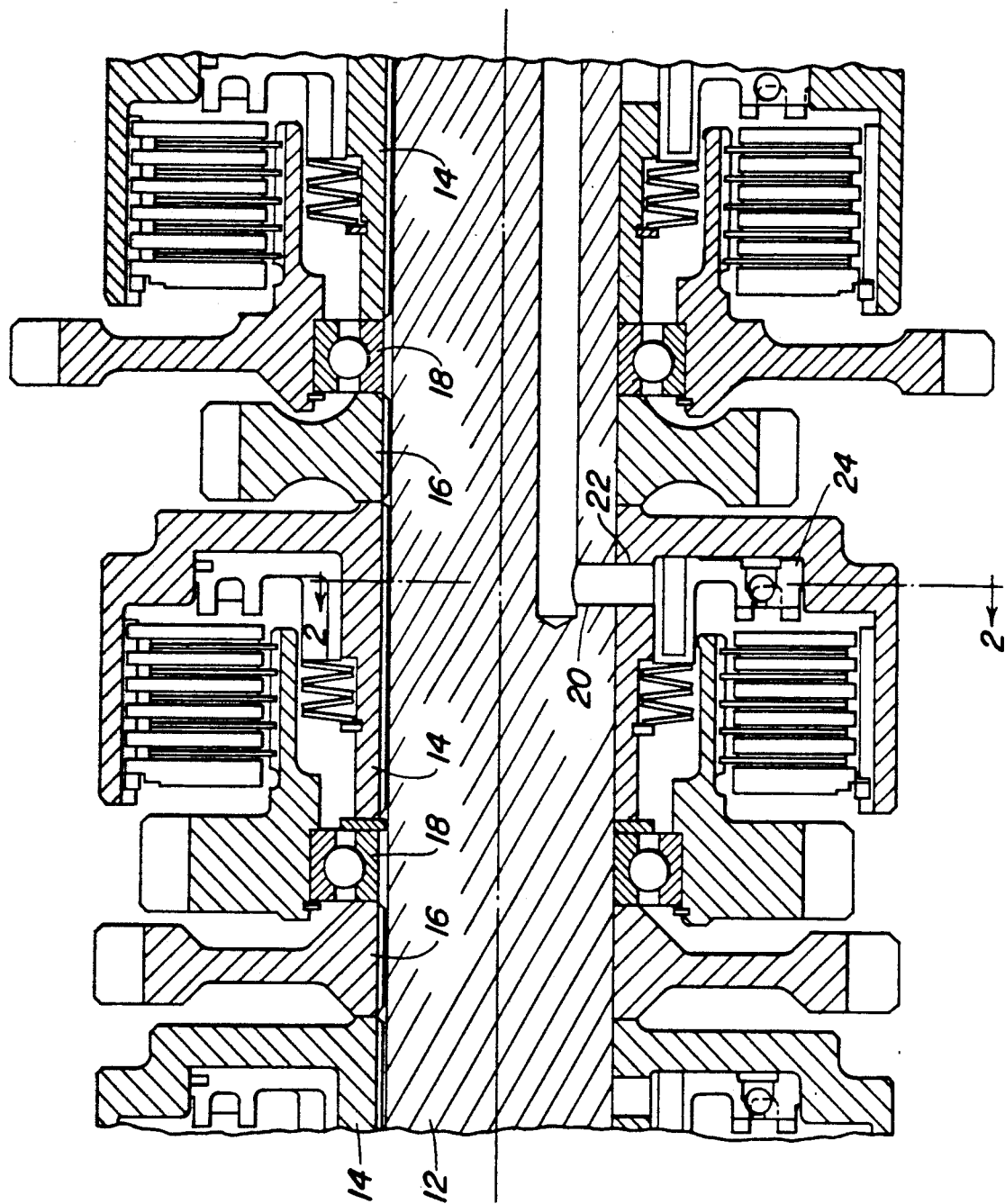
FIG. 1 is a cross-sectional view of a portion of a transmission including a clutch drum mounted according to the present invention.

FIG. 1 illustrates a cross-section through a portion of a transmission 10. The transmission includes a shaft 12 with several clutch drums 14, gears 16 and bearings 18 mounted thereto. A shaft oil passage 20 is shown connecting to a drum oil passage 22 to provide fluid to operate the clutch piston 24. Similar passages normally would be provided for the other clutch drums 14, but are omitted from the drawing for clarity of illustration.

Figure 2:
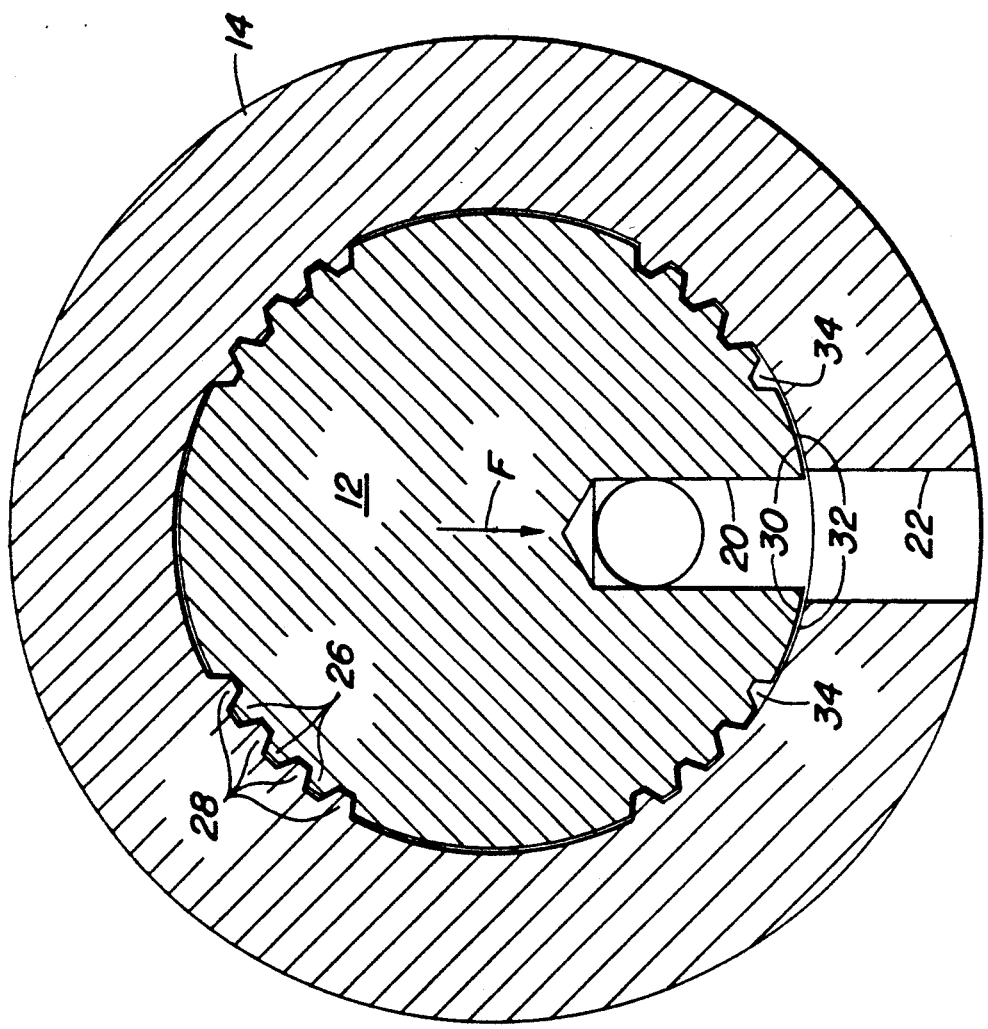
FIG. 2 is a cross-sectional view along line 2—2 in FIG. 1.

FIG. 2 illustrates a cross-section through the shaft 12 and one of the clutch drums 14. As may be seen in the figure, shaft 12 is provided with a plurality of splines 26 which mesh with a similar plurality of splines 28 provided on the clutch drum 14. The sides of these splines are angled, so that any torque applied to the splines will be resolved at least partially into radial forces.

According to the present invention, the sum of the radial forces intentionally is imbalanced, resulting in a net force on the shaft 12 in the direction of arrow F, or, the equivalent, a net force on the clutch drum 14 in the direction opposite to the arrow F. The result of this force is to press the surfaces 30 of the shaft 12 and the surfaces 32 of the clutch drum 14 tightly together, providing a seal between the oil passages 20, 22. Meanwhile, the remaining portion of the torque (which is not resolved into radial force) is transmitted via the splines 26, 28 between the shaft 12 and clutch drum 14.

There are many possible ways to create an imbalance in the radial forces resolved by the splines. Theoretically, a single spline with angled sides directly opposite from the oil passage might suffice, though it is unlikely that this would work in most situations due to the high shear forces involved. More practically, an uneven number of splines can be provided on opposite sides of the shaft. This can be done either by milling different numbers of splines or by omitting a spline from one of the components. In the embodiment shown in the drawing, the splines 28 on either side of the oil passage 22 have been omitted, as shown by the empty spaces 34.

One advantage to omitting splines from the clutch drum 14, rather than unevenly distributing them around the shaft 12, is that the splines on the shaft 12 then can be used to mount the various gears 16 and bearings 18 for which no net radial force is desired. These components then would simply include the spline which is omitted on the clutch drums, and their forces would be balanced.

Another advantage to this technique is that the various clutch drums on a shaft can have their oil passages at different positions around the circumference of the shaft 12. The forces then are resolved in the proper direction simply by omitting a spline on the appropriate side of the clutch drum.

It should be understood that numerous modifications can be made to the present invention. For example, the number of splines and the grouping of splines shown is purely for illustration. Any number of splines and spline groupings could be used, provided the necessary force imbalance is obtained. However, care should be taken to ensure that the force imbalance is not so large as to damage the components. For example, if less torque must be transmitted it has been found advantageous to use just three groupings of splines, rather than the four groupings shown in the drawings. Further, all of the splines in the figures are shown with an angled cross-section, but this is not necessarily required. Some of the splines could have straight sides, so long as enough of the splines have angled sides to generate the required force imbalance. Likewise, some or all of the splines could be involuted.

While the invention has been shown in connection with a clutch drum, the same technique can be used to provide a seal for other situations where oil passage connections between adjacent components might arise.

While the present invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A transmission component having a first member and a shaft, comprising:
   a first member passage formed in said first member and opening in a surface of said first member adjacent to said shaft;
   a first shaft passage formed in said shaft and opening in a surface of said shaft adjacent to said first member passage;
   a plurality of first member splines formed in said first member, at least some of said first member splines having angled sides;
   a plurality of shaft splines formed in said shaft and meshing with said first member splines, at least some of said shaft splines having angled sides meshing with corresponding angled sides of said first member splines, and wherein the number and positions of said first member splines and said shaft splines is such as to provide an imbalance in the radial forces generated by said angled sides upon application of torque thereto to create a net force pressing the surface of said first member around said first member passage sealingly against the surface of said shaft around said first shaft passage.

2. The transmission component of claim 1, wherein said shaft splines are symmetrically positioned about said shaft, and wherein at least one corresponding spline is omitted from said first member splines to produce said net force.

3. The transmission component of claim 2, wherein a spline is omitted from said first member splines on each side of said first member passage.

4. The transmission component of claim 2, further comprising a plurality of gears mounted to said shaft and fixed for rotation therewith by a plurality of gear splines formed on the inside of each said gear and meshing with said shaft splines.

5. The transmission of claim 1, wherein a second shaft passage is formed in said shaft opening to a surface of said shaft, and further comprising a second member having:
   a second member passage formed in said second member and opening in a surface of said second member adjacent to said second shaft passage;
   a plurality of second member splines formed in said second member, at least some of said second member splines having angled sides meshing with corresponding angled sides of said shaft splines, and wherein the number and positions of said second member splines and said shaft splines is such as to provide an imbalance in the radial forces generated by said angled sides upon application of torque thereto to create a net force pressing the surface of said second member around said second member passage sealingly against the surface of said shaft around said second shaft passage.

6. The transmission component of claim I, wherein said first member comprises a clutch drum having an actuating piston operable by fluid pressure in said first member passage.

* * * * *